Figure 1:
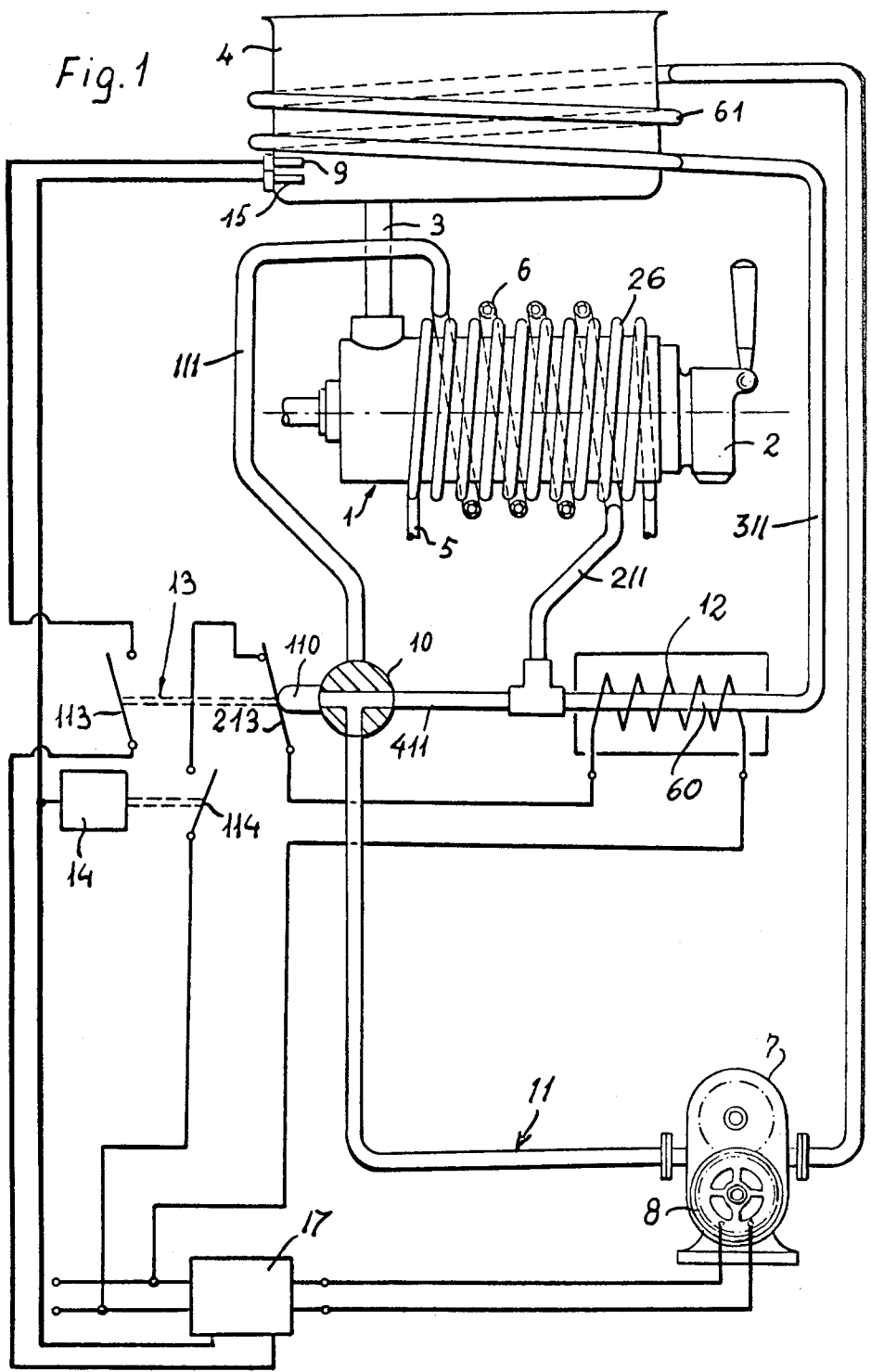

United States Patent [19]
Carpigiani

[11] 3,724,235
[45] Apr. 3, 1973

[54] SOFT ICE PRODUCT MACHINE WITH HEATING AND COOLING

[76] Inventor: Poerio Carpigiani, Via Cairoli 14, Bologna, Italy

[22] Filed: Mar. 11, 1971

[21] Appl. No.: 123,393

Related U.S. Application Data

[62] Division of Ser. No. 8,529, Feb. 4, 1970, abandoned.

[30] Foreign Application Priority Data

Feb. 8, 1969 Italy....................6787 A/69

[52] U.S. Cl.....................165/61, 62/162, 62/185, 165/24
[51] Int. Cl................................F25c 7/10
[58] Field of Search ....62/342, 162, 185; 165/65, 61, 165/24, 62

[56] References Cited

UNITED STATES PATENTS 3,291,200  12/1966  Lutz ...................................62/342 X
3,267,688   8/1966  Carpigiani ........................62/342 X

*Primary Examiner*—William E. Wayner
*Attorney*—Edwin E. Greigg

[57] ABSTRACT

The invention relates to a machine and method for making a soft ice cream product formed of frozen air and gelatin dispersion. Heating means are provided to melt the gelatin solution in the liquid mix tank before mixing same with air and feeling same into the freezing cylinder.

3 Claims, 2 Drawing Figures

SOFT ICE PRODUCT MACHINE WITH HEATING AND COOLING

This application is a divisional application of my copending application Ser. No. 8,529, filed Feb. 4, 1970, now abandoned.

This invention relates to a machine for the production of a soft ice cream product formed of frozen air-and-gelatin dispersion or "foam".

It is therefore the main object of the present invention to provide an improved soft ice cream machine by means of which it is possible to produce a gelatin soft ice cream starting from a liquid solution having gelatin dissolved in it.

A further object of the present invention is to provide as a new edible product a gelatin soft ice cream.

Still further object of the present invention is to provide a soft ice cream machine of the kind set forth, by means of which it is possible to produce either the new gelatin soft ice cream or a conventional soft ice cream, that is a soft ice cream not containing gelatin.

It is known that gelatin is an excellent dietary supplement and that its use as food is desiderable to increase the dietary protein, for growing children, for obese persons and for geriatric feeding.

However, the use of gelatin in soft ice cream was until now not possible since it was not possible to maintain the gelatin ice cream mix in the liquid mix tank of a continuous ice cream machine at the desired fluid consistency requested for being process in said machines.

According to the present invention these inconveniences are overcome in an efficient and economical manner by providing in the mix tank of a continuous ice cream machine heating means for heating the gelatin ice cream mix to the melting temperature of the said mix.

Most advantageously, the said mix is heated at a temperature in the range from about 5° to about 30°C.

In many cases, it may be advantageous to heat the gelatin ice cream mix in the mix tank of the ice cream machine at temperatures in the range of 70° to 100°C in order to sterilize the said mix, before feeding same into the freezing cylinder of the soft ice cream machine.

Figure 2:
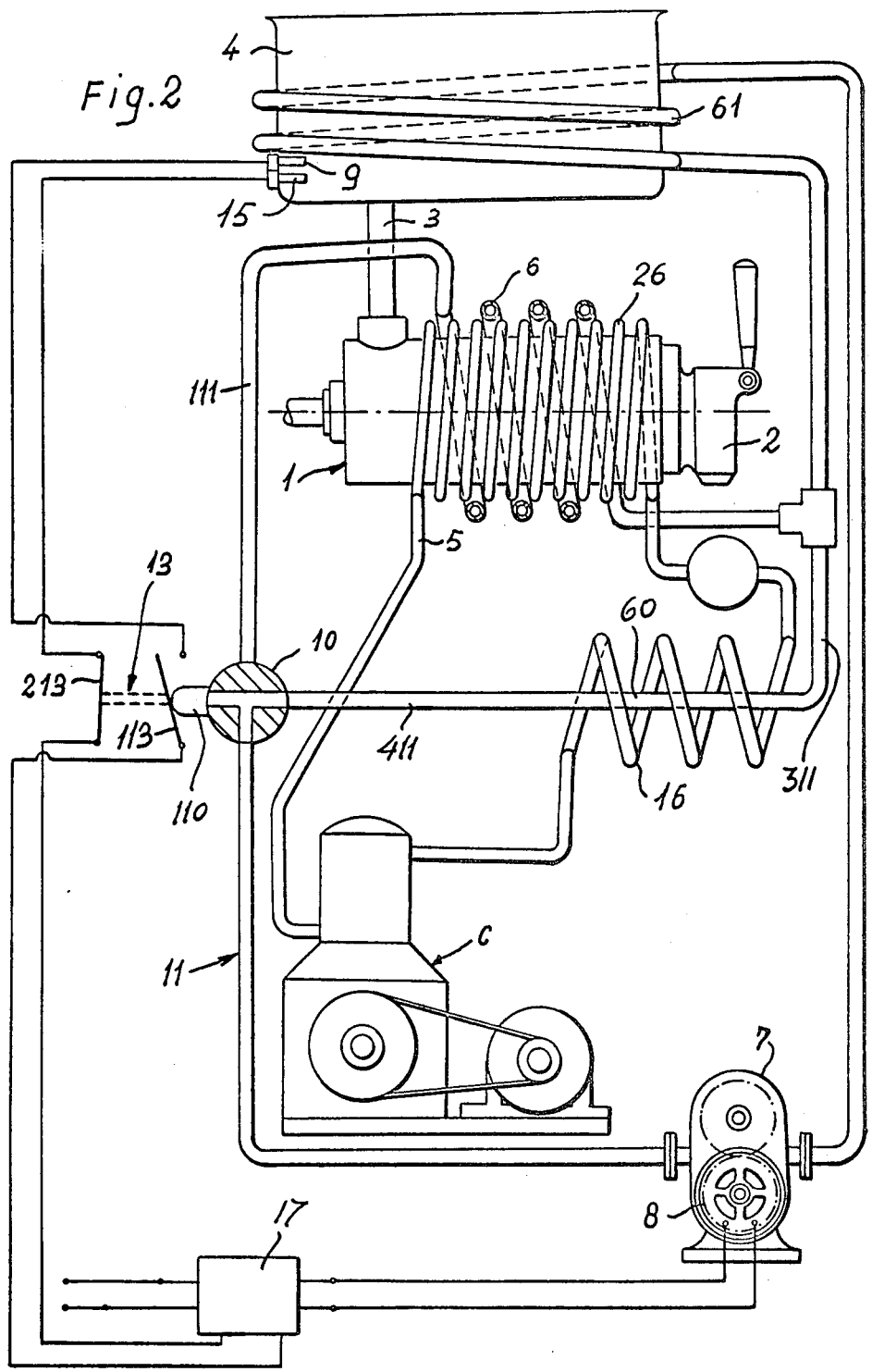

Further characteristic features and advantages of the present invention will be better apparent from the following specification of two embodiments of same, said specification being made with reference to the annexed diagrammatic drawings in which:

FIG. 1 is a first embodiment of the ice cream machine according to the invention, in which the ice cream mix tank is heated through a fluid circuit in heat exchange relation with electric heating means, and FIG. 2 is a second embodiment of the invention in which the said fluid circuit is heated through the condenser of the freezing unit of the ice cream machine.

With reference to the drawings, 1 denotes the mixing cylinder of a continuous type soft ice cream machine. Said cylinder carries at one end, as usual, an ice cream dispensing unit 2, while at its opposite end it is connected, for example through an upright pipe 3, with the mix tank 4 of the liquid mix to be frozen.

All around the cylinder 1 the evaporator coil 26 of the freezing unit of the ice cream machine is wound. The said freezing unit comprises, as usual (see FIG. 2) a motor operated compressor C, which is connected through pipe 5 to one end of the evaporator coil 26, the other end of the said evaporator coil 26 being connected, through a suitable valve V to one end of the condenser 16, which in turn is connected at its other end to the compressor C.

With reference to FIG. 1, the mix tank 4 is encircled by a coil section 61, in heat exchange relation therewith, forming part of a closed heat-transfer circuit 11 comprising a circulation pump 7, which is operated by motor 8, a coil section 6 in heat exchange relation with the evaporator 26, as well as a pipe section 60 in heat exchange relation with an electric heating element 12.

The reference 10 denotes a switch valve by means of which it is possible to insert the coil section 6 and the pipe section 60 in series through pipes 111, 211 and 311 in the circuit 11, or to by-pass the coil section 6, thus switching into circuit 11 the pipe section 60 only, through pipes 411 and 311.

The switch valve 10 is provided with a cam 110 acting on the multiple switch 13. The switch 13 is provided with a first contact 113 disposed in the electric circuit of a thermostat 9 mounted inside of tank 4 and adjusted to control the temperature of the liquid mix inside said tank within a temperature range of about −3° to −6°C (low temperatures thermostat). The second contact 213 of switch 13 is inserted into the electric circuit of the heating element 12. A second thermostat 15 is provided inside of tank 4, which thermostat 15 is adjusted to control the temperature of the liquid inside of tank 4 within a temperature range of say 5° to 30°C. The said thermostat operates, through relay 14, a switch 114 inserted in series with switch 213 into the circuit of the heating element 12.

Both thermostats 9 and 15 control indipendently through relay 17 the electric current feed to motor 8 of the pump 7.

The operation of the described machine is as follows.

For the production of the usual soft-ice cream, that is of milk-containing ice cream, it is necessary to maintain the liquid ice-cream mix inside of tank 4 at a low temperature, in order to avoid the development of germs in said mix.

To this end, the switch valve 10 is switched to a position in which the coil section 6 and the pipe section 60 are series connected in the circuit 11.

By the above referred movement of the switch valve, the cam 110 associated to switch valve 10 is brought into a position in which the switch 113 is closed and the switch 213 is open. In this manner, the thermostat 9 is inserted into the electric control circuit and the electric heating element is disconnected from the electric circuit.

The liquid in circuit 11 is circulated by the pump 7, operated by motor 8 controlled now by thermostat 9. The said liquid is now circulated through pipe 111, coil section 6, pipe 211, pipe section 60, pipe section 311 and coil section 61, thus cooling tank 4.

Whenever it is desired to use the machine described for the production of gelatin ice cream according to the invention, the valve 10 is switched into the position shown in FIG. 1, in which coil section 6 is by-passed from fluid circuit 11.

As best shown in FIG. 1, by switching valve 10 in the said position, the cam 110 operates switch 13 so as to close contact 213 and to open contact 113. The opening of contact 113 sets thermostat 9 out of the electric control circuit of the machine. Thermostat 15 is now operative, and it energizes relay 14, which in turn closes switch 114, thus inserting the electric heating element 12 into the electric circuit of the machine. The pump 7 is now circulating the heat transfer liquid in circuit 11 through pipe 411, heated pipe section 60, pipe 311 and coil section 61. In this manner, the liquid in tank 4 is heated to the desired temperature, under the control of thermostat 15, by the heated fluid circulating in circuit 11.

Whenever the temperature of the gelatin liquid mix in tank 4 attains a prefixed value, corresponding to the melting point temperature of the gelatin liquid mix, the thermostat 15 de-energizes relays 14 and 17, thus opening contact 114 excluding the heating element 12 from the electric circuit of the machine, and stopping motor 8.

For the production of the gelatin ice cream according to the invention a gelatin solution is used, to which suitable flavoring and/or other substances may be added. The said gelatin solution is maintained at its melting temperature in tank 4 by means of the heating circuit described. The fluid solution of gelatin is thereafter fed in a manner which is usual in soft ice cream producing machines, mixed with air in the freezing cylinder 1 of the machine in which the desired soft ice cream is produced.

The gelatin liquid mix in tank 4 may be heated at a temperature above its melting point, and advantageously at a temperature at which germs are destroyed, and for example at a temperature in the range of 70° to 100°C.

In FIG. 2 a second embodiment of the invention is shown.

The said embodiment is substantially corresponding to the embodiment of FIG. 1, and the same reference numerals are being used in FIG. 2 to designate the same or corresponding parts of the machine described with reference to FIG. 1.

The main difference between the embodiment of FIG. 2 and the one of FIG. 1 resides in the fact that according to FIG. 2 the pipe section 60 of the heat transfer circuit 11 is heated by the condenser 16 of the refrigerating machine, instead of by electric heating elements.

To this end, the pipe section 60 and the coil section 6 are each forming part of two parallel branches 411, 311 viz. 111, 211 of the liquid heat transfer circuit 11.

The said branches may be selectively switched through valve 10 into the circuit of the heat exchange fluid.

The cam 110 of valve 10 controls switches 113 and 213, which are inserted in the circuits of thermostats 9 and 15.

The operation of the embodiment of FIG. 2 is the same as described with reference to FIG. 1.

Having thus described my invention, what I claim is:

1. A soft ice machine for the production of soft ice cream or a gelatin soft ice product comprising a mixing and freezing chamber surrounded by an evaporator forming part of a refrigerating circuit, a tank disposed above said chamber for storing a liquid mix, means for feeding the said liquid mix from said tank to said mixing and freezing chamber, a heat transfer circuit for said tank comprising a first section in heat exchange relation with said evaporator, a second section in heat exchange relation with a heating means, and a third section in heat exchange relation with said tank, and means for selectively causing said first section or said second section to be effective to cause said third section to either cool or heat said tank, said heat transfer circuit being separate from said refrigerating circuit, power operated means for circulating a heat transfer fluid in said heat transfer circuit, and thermostatically controlled means for controlling the operation of said heat transfer fluid circulating means, whereby said tank may be selectively heated or cooled while said mixing and freezing chamber is being cooled by said evaporator of the refrigerating circuit.

2. A soft ice machine according to claim 1 in which said first and second heat sections are series connected, said heating means is an electric heating element, there is a flow control valve in said heat transfer circuit for causing flow of said heat transfer fluid selectively through either said first section, said second section, and said third section in serial, or flow through said second section and said third section in serial while bypassing said first section, and further comprising electric switch means operated by said flow control valve for disconnecting said electric heating element whenever said flow control valve connects said third heat exchange means with said first heat exchange means.

3. A soft ice machine according to claim 1, in which the said first and second heat exchange means are connected in parallel, and the said heating means is the condenser of the refrigerating circuit.

* * * * *